(12) United States Patent
Chiabaut et al.

(10) Patent No.: US 8,644,313 B2
(45) Date of Patent: *Feb. 4, 2014

(54) BREAK BEFORE MAKE FORWARDING INFORMATION BASE (FIB) POPULATION FOR MULTICAST

(71) Applicant: Rockstar Consortium US LP, Richardson, TX (US)

(72) Inventors: Jérôme Chiabaut, Ottawa (CA); David Allan, Ottawa (CA); Nigel Bragg, Weston Colville (GB)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,547

(22) Filed: Nov. 2, 2012

(65) Prior Publication Data

US 2013/0064074 A1    Mar. 14, 2013

Related U.S. Application Data

(63) Continuation of application No. 13/048,614, filed on Mar. 15, 2011, now Pat. No. 8,331,367, which is a continuation of application No. 12/260,558, filed on Oct. 29, 2008, now Pat. No. 7,924,836.

(30) Foreign Application Priority Data

Jan. 11, 2008    (GB) .................................. 0800478.0

(51) Int. Cl.
*H04L 12/28* (2006.01)
(52) U.S. Cl.
USPC ........... 370/390; 370/241; 370/242; 370/248; 370/351; 370/389; 370/391
(58) Field of Classification Search
None
See application file for complete search history.

(56) References Cited

U.S. PATENT DOCUMENTS 7,924,836 B2    4/2011    Chiabaut et al.
(Continued)

FOREIGN PATENT DOCUMENTS

GB    2422508 A    7/2006

OTHER PUBLICATIONS

Pierre Francois and Olivier Bonaventure, "Avoiding Transient Loops During the Convergence of Link-State Routing Protocols", IEEE/ACM Transactions on Networking 15(6):1280-1932, Dec. 2007, pp. 1-13.

*Primary Examiner* — Hassan Phillips
*Assistant Examiner* — Gautam Sharma
(74) *Attorney, Agent, or Firm* — Pearne & Gordon LLP

(57) ABSTRACT

A method of installing forwarding state in a link state protocol controlled network node having a topology database representing a known topology of the network, and at least two ports for communication with corresponding peers of the network node. A unicast path is computed from the node to a second node in the network, using the topology database, and unicast forwarding state associated with the computed unicast path installed in a filtering database (FDB) of the node. Multicast forwarding state is removed for multicast trees originating at the second node if an unsafe condition is detected. Subsequently, a "safe" indication signal is advertised to each of the peers of the network node. The "safe" indication signal comprises a digest of the topology database. A multicast path is then computed from the network node to at least one destination node of a multicast tree originating at the second node. Finally, multicast forwarding state associated with the computed multicast path is installed in the filtering database (FDB) of the network node, when predetermined safe condition is satisfied.

13 Claims, 3 Drawing Sheets

(56) References Cited

U.S. PATENT DOCUMENTS

| | | |
|---|---|---|
| 2002/0093954 A1 | 7/2002 | Well et al. |
| 2004/0073700 A1 | 4/2004 | Chaudhuri |
| 2005/0078656 A1 | 4/2005 | Bryant |
| 2007/0019646 A1 | 1/2007 | Bryant et al. |
| 2007/0025277 A1 | 2/2007 | Sajassi et al. |
| 2007/0086361 A1 | 4/2007 | Allan |
| 2007/0165657 A1 | 7/2007 | Smith et al. |
| 2008/0170550 A1 | 7/2008 | Liu et al. |

BREAK BEFORE MAKE FORWARDING INFORMATION BASE (FIB) POPULATION FOR MULTICAST

CROSS-REFERENCE TO RELATED APPLICATIONS

This application is a continuation application of U.S. patent application Ser. No. 13/048,614 entitled "Break Before Make Forwarding Information Base (FIB) Population for Multicast" filed Mar. 15, 2011, which was a continuation of U.S. patent application Ser. No. 12/260,558 entitled "Break Before Make Forwarding Information Base (FIB) Population for Multicast" filed Oct. 29, 2008, which issued as U.S. Pat. No. 7,924,836 on Apr. 12, 2011.

MICROFICHE APPENDIX

Not Applicable.

TECHNICAL FIELD

The present invention relates to management of traffic forwarding in packet networks, and in particular to methods of preventing loops in multicast routes mapped through a packet network.

BACKGROUND OF THE INVENTION

Network operators and carriers are deploying packet-switched communications networks in place of circuit-switched networks. In packet-switched networks such as Internet Protocol (IP) networks, IP packets are routed according to routing state stored at each IP router in the network. Similarly, in Ethernet networks, Ethernet frames are forwarded according to forwarding state stored at each Ethernet switch in the network. The present invention applies to communications networks employing any Protocol Data Unit (PDU) based network and in this document, the terms "packet" and "packet-switched network", "routing", "frame" and "frame-based network", "forwarding" and cognate terms are intended to cover any PDUs, communications networks using PDUs and the selective transmission of PDUs from network node to network node.

Multicast forwarding of data packets (where packets are sent from a source node to multiple destination nodes more or less simultaneously) is of increasing importance as demand for services such as PTV and Video on Demand (VoD) grows.

Protocols such as Intermediate System—Intermediate System (IS-IS) and Open Shortest Path First (OSPF) and Multicast OSPF are used to distribute topology information to permit distributed calculation of paths that interconnect multiple nodes, resulting in the installation the forwarding state required to implement those paths. OSPF and IS-IS are run in a distributed manner across nodes of the network so that, for example, when a topology change occurs in the network such as a node or link failure, this information is flooded to all nodes by the protocol's operation, and each node will locally recompute paths to circumvent the failure based on a consistent view of network topology.

In Ethernet networks, Provider Backbone Transport (PBT), also known as Provider Backbone Bridging-Traffic Engineering (PBB-TE), as described in Applicant's British patent number GB 2422508 is used to provide a unicast Ethernet transport technology. Provider Link State Bridging (PLSB) as described in Applicant's co-pending U.S. patent application Ser. No. 11/537,775 will be used to provide a multicast transport capability for Ethernet networks using IS-IS to set up both unicast paths and multicast trees in the network. Both above patent documents are hereby incorporated by reference.

While the present invention is not limited to the application of a routing system to Ethernet bridging, Ethernet terminology is used in this disclosure where possible. So, for example, the term filtering database (FDB) can be considered interchangeable with any term for an information repository of packet forwarding information, such as forwarding information base or label information base.

FIG. 1 is a flowchart illustrating the principle steps in an all-pairs shortest path multicast route computation algorithm (known, for example, from Applicant's co-pending U.S. Patent Application Publication No. 20070165657), which is normally implemented in each node. In this example it is assumed that included in routing system advertisements is multicast group membership information, although it is easy to envision that multiple systems may be combined to achieve the same result.

As shown in FIG. 1, upon receipt of either a multicast group membership change or a network topology change (for example via a Link State Packet—LSP) the node employs algorithms such as Dijkstra's algorithm to compute both unicast connectivity (at S2) and the set of pairs of network nodes where the computing node lies on the shortest path between the pair. For that set of node pairs, the node determines where intersections of multicast group membership occur, which define the required FDB entries to instantiate it's portion of multicast paths accordingly. Both Unicast and Multicast forwarding state implementing the computed forwarding is then installed in the node's filtering database (FDB), at S4, so that received packets can be forwarded to the appropriate output port(s) of the node, based on the destination address in the frame.

As is known in the art, network nodes can be implemented with either a single common FDB which is used to control forwarding of traffic received through all input ports (interfaces), or a respective different FDB for each input port or subsystem. In the case of a node having a respective different FDB associated with each input port, multicast forwarding state can be installed in the respective FDB of the appropriate input port, which may be identified using the computed unicast path to the root node of the multicast tree.

Typically, changes in the network topology, whether detected directly by a node (e.g. a failure of a physical link connected directly to the node) or indirectly (e.g. via receipt of a Link State Advertisement, LSA) will be reflected in changes in a Network Topology Database. Accordingly, recomputation of forwarding state in response to changes in network topology may be triggered by a change in the network topology database. In any event, following a network topology change, the (old) forwarding state will remain in effect until new forwarding state is installed in the FDB.

In a network where path computation is distributed, there is always the danger of the loose synchronization of the routing databases that the local FDB is derived from, and other variations in individual node implementation such as compute capacity, speed with which the internals can be synchronized etc. This loose synchronization can result in transient loops. A high level summary is that transient loops can occur due to the physical impossibility of instantaneously distributing and acting upon state change information across multiple nodes of the network. Looping of packets is at best wasteful of network resources, and at worst may result in congestive network failure. Looping is significantly more serious for multicast forwarding than for unicast forwarding because packets may be replicated outside of and forwarded around, such a loop, resulting in an explosion of packet creation and forwarding.

There are various approaches to mitigating the problems of loops appearing in a network. In IP networks, IP packets have a Time To Live (TTL) counter which is decremented at each hop and will eventually cause looping packets to be discarded. Routers will not forward packets where the TTL counter has been decremented to zero. However, this merely "limits the size of the blast crater" created by the loop. Spanning Tree Protocol is used in Ethernet networks to block ports during periods of network instability, which shuts down all traffic, not simply the traffic whose forwarding paths were directly impacted by the network change, and unblocks the ports only when the network has converged in a new loop free solution. This prevents loops, but is wasteful of network resources in reasonably sized networks, disrupts traffic out of proportion to the topology change, and is incompatible with technologies that exploit Ethernet mesh connectivity such as PBT and PLSB. Other mitigating approaches include ordering the installation of forwarding state in a controlled manner as described in a paper "Avoiding Transient Loops During the Convergence of Link-State Routing Protocols" Pierre Francois and Olivier Bonaventure, IEEE/ACM TRANSACTIONS ON NETWORKING 15(6):1280-1932, December 2007. However, this slows down fault recovery times which is unattractive to network operators.

The application of a Reverse Path Forwarding Check (RPFC) to packets is a well known technique that reduces the probability of packet looping by eliminating promiscuous packet receipt at intermediate nodes (i.e. arrival on any port is not acceptable), converting the forwarding to what is known as a directed tree. This is accomplished by ensuring that any packet received from a given source arrives on an expected port for that source at each intermediate node. In the case of an Ethernet bridge, there will be only one expected port. When a packet sent from a given source node arrives at an intermediate node on a particular port or interface, a check is performed to see if there is a matching entry for the source address of the packet in the intermediate nodes filtering database for that port or interface. If there is, the packet is forwarded as normal. If not, the packet is dropped. In other words, a check is performed to see if the packet came in on a port or interface that the intermediate node would itself use for forwarding a packet on the "reverse" unicast path to the source node. For some packet forwarding paradigms, there may be more than one valid port that can be used to reach a given source (e.g. equal cost multipath), in which case the degree of robustness provided by RPFC is diminished. For PLSB there is a one-to-one correspondence between the partial multicast tree from the source node to the intermediate node, and the reverse unicast path from the intermediate node back to the source node, in any given Backbone VLAN Identifier (B-VID). Accordingly, if a packet is received from the source node via any port other than the one port that corresponds to the reverse unicast path, then an inference can be made that a loop may exist.

When constructing multicast trees, it may be necessary or desirable to construct individual source-specific point-to-multipoint trees (known as (S, G) trees). In such trees, the source is encoded as part of the destination address. As a result, an explicit Reverse Path Forwarding Check (RPFC) is not required if the (S, G) tree multicast address is only installed on ports facing the tree root, because an implicit RPFC is performed by the presence of the multicast address on the port. Throughout this description, the term "RPFC" is used to cover both explicit and implicit versions of the technique.

RPFC eliminates most circumstances in which looping may occur. However, there remain circumstances in which a transient loop may occur. Specifically, it can be shown that, even when using RPFC, a transient loop may occur when two or more topology changes occur more or less simultaneously. It is possible to consider a number of permutations of two simultaneous topology changes and the partial dissemination of knowledge of each which could achieve the same result, the example considered being of interest as both changes are not immediately adjacent to the nodes that will ultimately break the loop when they have completed computation and installation of their forwarding tables.

FIGS. 2a-d illustrate a simple scenario in which a transient loop may occur. In these figures, a network fragment is shown, which comprises nodes B, C, D, E and R, where R is the source or root node for a multicast tree considered in this example. In the illustrated network, physical links are shown by lines between respective nodes, along with the respective cost of each link (indicated by the value of c). The route followed by packets being forwarded through the multicast tree is shown by arrows, which traces the least cost routing through the network. Thus, in the network state illustrated in FIG. 2a, forwarding state is installed in node R for forwarding packets to node B; and in nodes B, C and D for forwarding packets to nodes C, D and E, respectively. FIGS. 2b-d illustrate state transitions that occur in the network as a result of two topology changes in the network; in this example, the physical link between nodes R and B is broken, and a new, low-cost, link becomes available between nodes E and B, so that this new link is part of the lowest cost route between nodes D and C.

Referring to FIGS. 2b and 2c, when the physical link between nodes R and B is broken (indicated by a cross in the figures), this topology change will be propagated through the network (initially from nodes R and B), for example using a conventional Link State Advertisement (LSA) process. Consequently, nodes B, C, D and E will become aware of the topology change, and will begin re-computing the multicast tree to utilize the physical link from R to D. Similarly, when the new link between nodes E and B becomes available, this topology change will be propagated through the network (initially from nodes E and B). Consequently, nodes B, C, D and E will become aware of the topology change, and will begin re-computing the multicast tree to utilize the new link between nodes E and B. If these two topology changes occur sufficiently far apart in time, then the recomputation of the multicast tree in response to failure of the physical link between nodes R and B, and installation of new forwarding state in all of the affected nodes, will have time to finish before the recomputation of the multicast tree to utilize the new link between nodes B and E begins.

However, if both changes occur close enough in time (that is, they are approximately simultaneous), as shown in FIG. 2b, then the two multicast tree recomputations will overlap in time. For example, in response to the topology change due to failure of link R-B, nodes R, B, C, D and E begin recomputing the multicast path to utilize the link between nodes R and D. While this recomputation is proceeding, the previous forwarding state installed in each node remains in place, so node B continues to forward queued packets to node C. Nodes C and D, in turn, continue forwarding packets to nodes D and E, respectively.

Meanwhile, nodes B and E will be the first nodes to become aware of the availability of the new link, and so will be the first nodes to begin recomputing the multicast tree to use this link. When they complete their respective path recomputations and install the new forwarding state, node E will begin forwarding packets to node B, and node B will continue forwarding packets to node C. If this occurs before nodes C or D have completed their respect path re-computations, the scenario illustrated in FIG. 2c can occur. In this scenario, node E has installed forwarding state for forwarding packets to node B, but node C is still forwarding packets to node D (in accordance with its previous forwarding state—which has not yet been updated), resulting in a loop around nodes B, C, D and E. This loop will persist until such time as either of nodes C or D has recomputed the multicast tree and installed forwarding state to account for at least one of the two topology changes. When this latter recomputation is completed, the network will transition to the loop-free state illustrated in FIG. 2d, in which the loop is broken. However, during the transient period while the network is in the intermediate state shown in FIG. 2c, the loop may cause significant congestion or damage to the network.

Techniques for reducing the probability of transient loops in packet switched networks remain highly desirable.

SUMMARY OF THE INVENTION

Thus, an aspect of the present invention provides a method of coordinating the installation of forwarding state in a link state protocol controlled network node having a topology database representing a known topology of the network, and at least two ports for communication with corresponding peers of the network node. A unicast path is computed from the node to a second node in the network, using the topology database, and unicast forwarding state associated with the computed unicast path is installed in a filtering database (FDB) of the node. Detecting whether or not an unsafe condition exists, and, when an unsafe condition is detected, multicast forwarding state is removed for multicast trees originating at the second node. Subsequently, a "safe" indication signal is advertised to each of the peers of the network node. The "safe" indication signal comprises a digest of the topology database. A multicast path is then computed from the second network node to at least one destination node of a multicast tree. Finally, multicast forwarding state associated with the computed multicast path is installed in the filtering database (FDB) of the network node, when a corresponding "safe" indication signal has been received from at least one of the peers of the network node.

In some embodiments, computation of the unicast path is performed in response to a change in the topology database. This change may be indicated by either a detected change in the network itself, or receipt of a message (such as, for example, a Link State Advertisement, LSA) containing information of a change.

Computation of a unicast path may comprise computing respective unicast paths to every other node in the network. In some embodiments, computation of a unicast path may comprise computing respective distances to every other node in the network.

In some embodiments, detecting the unsafe condition comprises detecting a difference in a characteristic of the unicast path to the second node relative to a previous unicast path to the second node. In some embodiments, the characteristic is the distance to the second node. In other embodiments, the characteristic is the route traversed by each of the computed and previous unicast paths to the second node.

In some embodiments, detecting the unsafe condition comprises determining whether the computed unicast path would not have been a valid path on the previous topology (where "valid" is defined as the new path to the second node having a monotonic decrease in distance to the second node when traversed on the previous topology).

An advantage of the present invention is that, when a change occurs in the network, each node first makes itself safe (by the installation of unicast reverse path filtering information and the blocking any multicast traffic affected by the change in the network topography), and advertises that it has done so, before calculating the new multicast forwarding state. However, it cannot instantiate the changed multicast forwarding state until its neighbours (peers) have also indicated that they have made themselves "safe". This achieves a significant degree of parallelism in the operation of synchronization, as typically upon completion of computation of multicast state, a node will have already received "safe" indication from its peers. The amount of computation to get to the "safe" state is only a fraction of that to compute the multicast FDB entries, requiring the computation of a single SPF tree only.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method of computation and installation of multicast forwarding state in a network, in which the likelihood of transient loops is minimized, as compared to conventional methods. In a well behaved network, the likelihood of transient loops may be considered to be substantially eliminated. Embodiments of the invention are described below, by way of example only, with reference to FIGS. 3-4d.

Figure 1:
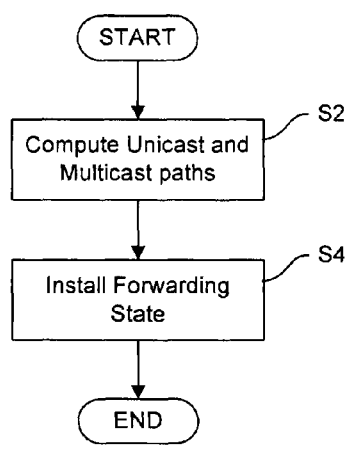
FIG. 1 is a flow-chart showing principle steps in a conventional method of computing and installing forwarding state in nodes of a multicast tree.

As described above with reference to FIG. 1, when a node detects or is informed of a change in the network topology, it re-computes the shortest path between each node in the network such that the computing node can determine for which shortest paths it is an originating, transit or terminating node. When multicast group membership information is also advertised by the control plane, the node can then determine where intersections of multicast group membership occur for each of those pairs, inferring a multicast path accordingly. The forwarding state required to implement those paths is then installed in the node's filtering database (FDB), so that packet traffic received (directly or indirectly) from any node can be properly forwarded toward the destination node(s). Until the new forwarding state is installed, packets continue to be forwarded in accordance with the old forwarding state, that is, without regard to the changed topology of the network.

As described above, inconsistent distribution of topology change notifications combined with the delay in re-computing and installing new forwarding state creates the opportunity for transient loops to form. In general it takes a combination of elements from two or more non-looping versions of a multicast tree to produce a loop. This combination being produced by two or more topology changes, one which closes the loop, and one which changes the path to the root. Each multicast tree will have a unique component which, when combined with elements from other versions of the multicast tree, closes the loop. And, because of the RPFC performed by the network nodes, there must be at least two common components that connect the unique portions of each version of the multicast tree together.

In a network of n nodes, computation of unicast paths from any given node to all other nodes is a computational problem of order n log n, whereas computation of multicast paths is a computational problem that may reach order $n^2$ log n, and will always be more resource consuming than the unicast computation. As a result, for any given node in the network, re-computation of the unicast paths will normally be completed in less time than re-computation of the multicast paths. Further effects that will tend to enlarge the window within which a network is not synchronized and therefore may have transient loops, such as compute capability of individual nodes or overall network size, will also tend to extend multicast tree computation times far more than the unicast path computation times.

The inventors of the present invention have recognised that transient loops cannot form in a well behaved system if there is direct traceability of agreement on the path to the root of a given multicast tree from a given point in the network all the way to the root. At that point RPFC has ensured that the only valid source for a multicast tree is the root.

In practice such agreement can be verified by: invalidating multicast entries for a multicast tree when it has been determined that the path to the root of the tree has changed, as traceability of agreement has been lost; and only re-installing multicast entries when peers agree that they have similarly invalidated multicast state (new multicast forwarding state can be installed because all peers are safe) or for whom the path to the root has not changed (again the peer is safe, but this is because the traceability to the root was not interrupted). In both cases the agreeing nodes need to agree on what the multicast tree should be. The result is contiguous connectivity to the root will only occur when agreement is reached between nodes for which the path to the root has changed, or when a node for whom the path changed is adjacent to one for which it has not. It should be noted that since a node will only install multicast state when both it and its peers agree on the path to the root of the multicast tree, isolated looping in regions without traceability to the root cannot happen.

The inventors also acknowledge that it is possible to achieve an aggregated agreement on "safe" (that is, not specific to any individual multicast tree) by simply agreeing on the information from which any number of trees were derived. An example being a digest or checksum of the entire topology database.

In the example discussed above with reference to FIGS. 2a-d, any possibility of looping will be broken upon the nodes detecting that, with the failure of link RB, the path to the root has changed, and therefore all multicast entries for trees originating at node R should be invalidated. More generally, the likelihood of transient loops can be minimized by implementing a path computation algorithm such that both RPFC and traceability are facilitated and inherent to the process. A representative algorithm that achieves this result is described below with reference to FIGS. 3 and 4a-d.

Figure 3:
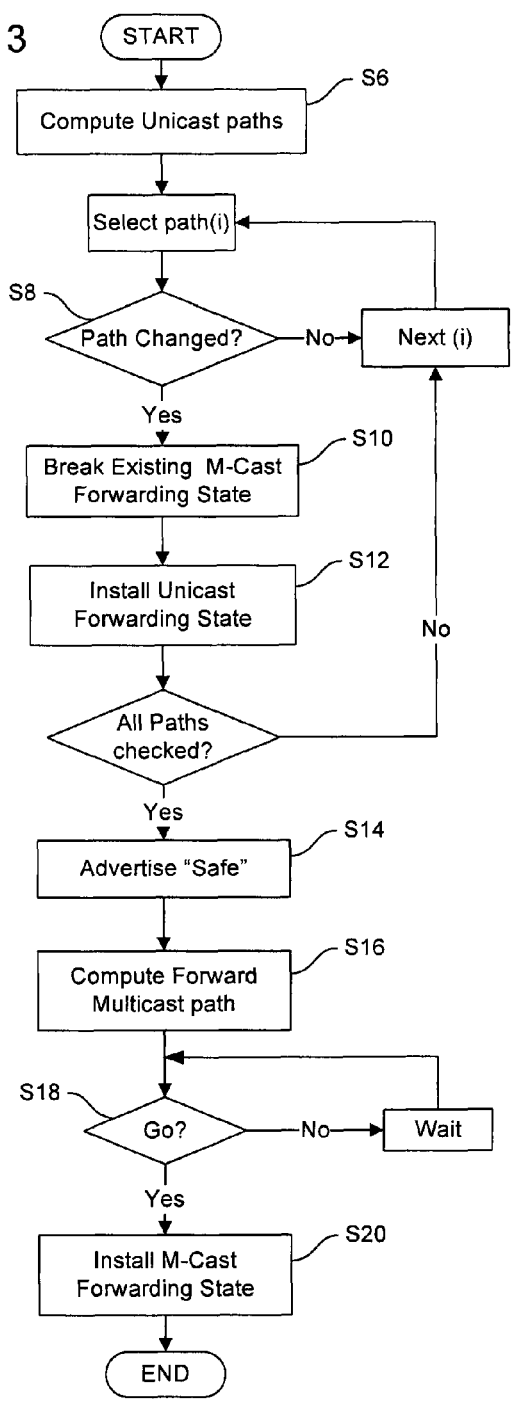
FIG. 3 is a flow-chart showing principle steps in a method of computing and installing forwarding state in nodes of a multicast tree, in accordance with a representative embodiment of the present invention.

In the embodiment of FIG. 3, when a network topology change is detected (or, equivalently, when the network topology database is changed), a node first computes (at S6) the shortest (unicast) path from itself to all other nodes in the network. The node then examines the computed unicast paths to identify any nodes for which the unicast path to that node has changed (at S8) and traceability to the root is now suspect. For each such node, multicast forwarding state for which that node is the root of the respective multicast tree is then removed from the FDB (at S10). Unicast forwarding state for each changed unicast path can then be installed in the node's Filtering Database (FDB), at S12. For implementations that can also perform RPFC, sufficient information will then exist in the FDB to perform this additional loop mitigation filtering.

There is a condition under which the path to the root changes, but multicast forwarding may be allowed to continue. This is when the computed distance between the node and a second node does not change. Under these circumstances, no loop can form and the multicast forwarding state for which that second node is the root of the multicast tree can be kept in the FDB and/or updated without waiting for a safe condition.

There is another condition under which the path to the root changes, but forwarding may be allowed to continue. This is when the new path to the root existed in its entirety in the topology database before the change, but was unused in that topology. Under these circumstances, no loop can form provided that each neighbour to which the node is transmitting on a multicast tree was further from the root in the topology prior to the change than the node's new next hop towards the root is in the new topology. This can be implemented as a per tree condition, so that multicast forwarding state for the entire tree is removed if any neighbour receiving from the node fails to satisfy the condition above, or it can be applied per neighbour, with filtering of the forwarding state to block transmission only to those neighbours which fail to satisfy the condition above.

As will be appreciated, removal of multicast state for multicast trees rooted at nodes to which the unicast path has changed blocks any multicast paths that were affected by the network topology change. Not restoring the multicast path until a neighbour indicates it has similarly either blocked the state, or the tree past that neighbour was unaffected by the change, and is therefore loop free extending to the root, prevents inadvertently creating a loop during installation of the new multicast forwarding state.

The node then advertises (at S14) a digest of the network topology database to each of its peers in the network. This digest will normally contain information reflecting the new network topology. In some embodiments, the digest may take the form of a condensed or lossy representation of the contents of the topology database. In other embodiments, the digest may be a hash or checksum computed over the topology database. This advertisement can be interpreted, by each peer node that receives it, as a "safe" indication signal indicating that the advertising node is "safe", at least in-so-far as it is aware of the new network topology and has removed multicast forwarding state for any multicast trees for which the path to the root has changed.

Once the digest has been advertised, the node begins re-computation of multicast paths (at S16). However, installation of the new multicast forwarding state (at S20) is delayed until a predetermined "go" condition is met (at S18), which guarantees that installation of the new multicast forwarding state will not create a loop. In the case of a node having a single FDB common to all ports and not performing reverse-path forwarding check, the "go" condition to install the multicast forwarding state in the FDB is having received a "safe" indication signal, from all of the node's peers, with a network digest that matches that advertised by the node. In the case of a node having a respective different FDB associated with each input port or a node performing reverse-path forwarding check, the "go" condition to install multicast forwarding state for a multicast path, is receipt of a "safe" indication signal from each of the peers of the node that are on that path, with a network digest that matches that advertised by the node. The requirement for matching digests ensures that each of the involved network nodes has made itself "safe" with respect to the same version of the network topology database. This prevents a scenario in a node inadvertently creates a loop by installing multicast forwarding state in response to receipt of a "safe" indication signal which was generated on the basis of a different view of the network topology.

In the case of a node having a respective different FDB associated with each input port or a node performing reverse-path forwarding check, the "go" condition can be relaxed further. If the computed distance between the node and the second node is less than the former distance then the "go" condition to install the multicast forwarding state in the FDB is having received a "safe" indication signal, from the node's peer that is one hop toward the second node, with a network digest that matches that advertised by the node. If the computed distance between the node and the second node is greater than the former distance then the "go" condition to install the multicast forwarding state in the FDB is having received a "safe" indication signal, from all the node's peers on the multicast path that are one hop further away from the second node (that is, towards one or more destinations of the multicast tree), with a network digest that matches that advertised by the node.

It is anticipated that the foregoing process will be implemented in parallel by all nodes in a given network domain, so as to achieve distributed computation of paths across the network in response to changes in network topology. Furthermore, this process can be used, generally without modification, to install forwarding state for new paths being mapped through the network in response to customer requests. In such cases, where no actual change in the network topology has occurred, it will only be necessary to compute unicast paths to the node(s) involved in the customer requested new path, and the check at step S8 will not identify any existing paths that are affected by the (non-existent) topology change, so it will not be necessary to remove forwarding state for any existing multicast trees (at S10). However, the advertisement of "safe" indication signals, and delaying the installation of multicast forwarding state for the new path, as described above with reference to FIG. 3, are still beneficial because they guarantee that installation of the new multicast forwarding state in each node will not inadvertently create a loop.

It will be appreciated that further network changes may occur during execution of the above-noted process; that is, prior to completion of installation of the new multicast forwarding state in the FDB. In some embodiments, the receipt of further topology database updates cause the process to reset, and begin again with computation of new unicast paths, progressing through a new "safe" indication advertisement and multicast FDB computation.

FIGS. 4a-d illustrate operation of this process, in the network fragment and topology change scenario of FIGS. 2a-d.

Figure 2A:
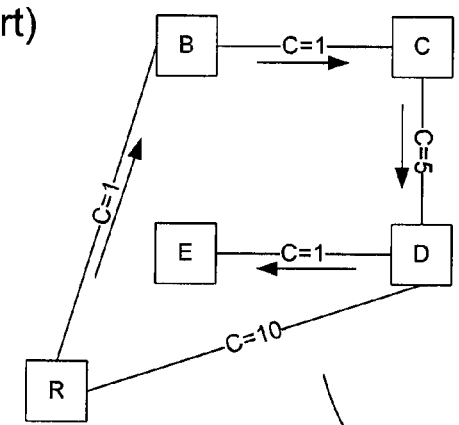
FIGS. 2a-2d is a block diagram schematically illustrating state changes in a network subject to two topology changes, using the process of FIG. 1.
Figure 2B:
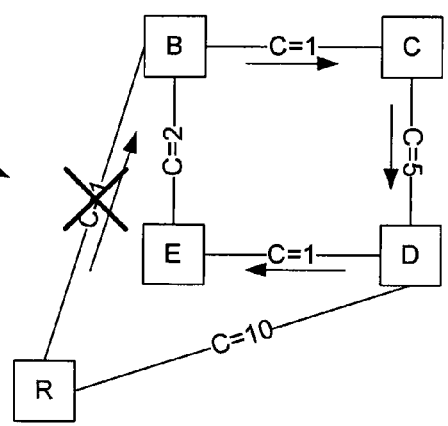
Figure 2C:
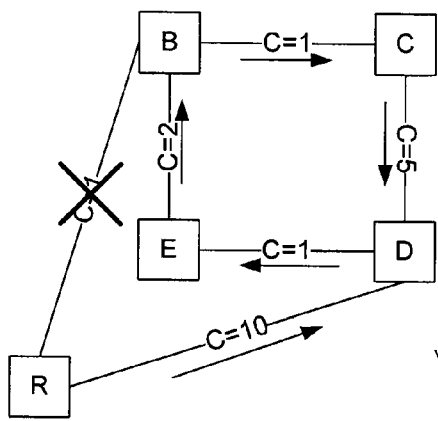
Figure 2D:
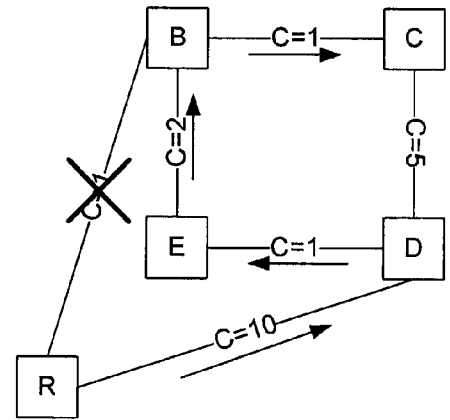
Figure 4A:
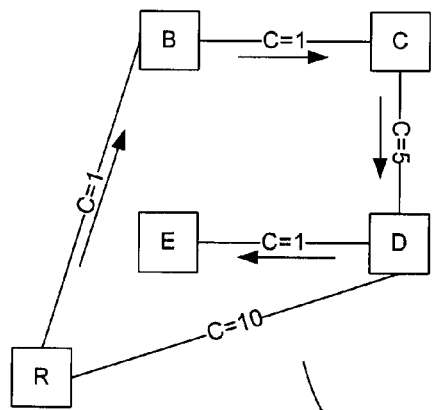
FIGS. 4a-4d is a block diagram schematically illustrating state changes in a network subject to two topology changes, using the process of FIG. 3.
Figure 4B:
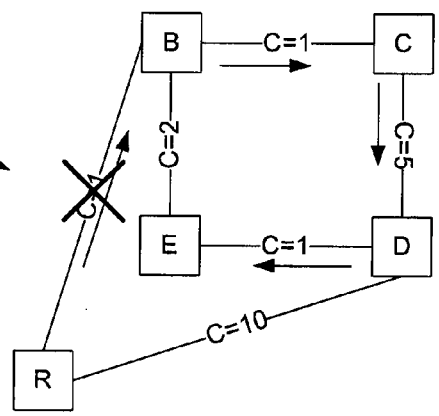
Figure 4C:
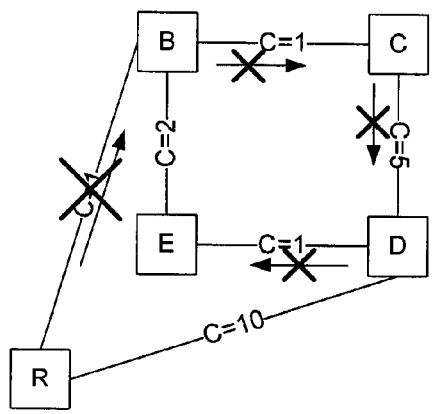
Figure 4D:
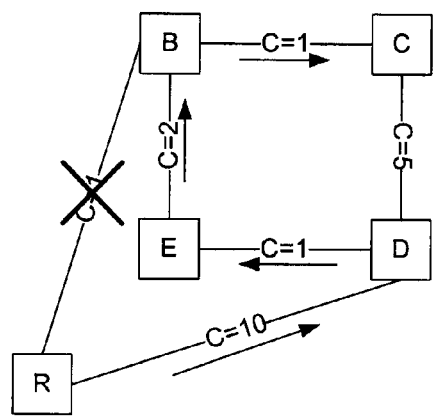

FIG. 4a corresponds with FIG. 2a, and shows the network fragment prior to the topology changes. FIG. 4b shows the two previously discussed simultaneous topology changes, namely: breaking of the physical link between nodes R and B; and additional of a new low-cost link between nodes D and E. These changes will be propagated across the network in a conventional manner, so that nodes B, C, D and E will begin re-computing the multicast tree to accommodate the new network topology. However, unlike in the conventional process discussed above with reference to FIGS. 2a-d, in the embodiment of FIG. 4, all four nodes will first compute unicast routes to other nodes in the network, and then break existing forwarding state related to the multicast tree (indicated by crosses through the arrows in FIG. 4c). In so doing, multicast traffic forwarding through the multicast tree is interrupted, in particular as the path to R has changed for all the nodes in the network, the multicast entries for trees rooted on R will be removed. Each node then installs new unicast forwarding state, as appropriate, and advertises respective "safe" indication signals. With specific reference to node D, this operation has the effect of completing the connection through the physical link to the source node R, and at the same time ensures that node D will discard any packets subsequently received from R via any other node (most importantly, in this example, from node C). When each node completes installation of forwarding state related to its unicast path(s), it begins its multicast computation. As each node receives "safe" indication signals from its neighbours, and completes installation of multicast forwarding state in its FDB, the network transitions to the stable state illustrated in FIG. 4d.

As may be appreciated, the order of operations implemented in accordance with the preset invention eliminates the probability of a transient loop existing in a sane system and minimizes the period of time during which such a loop could persist in the presence of insane nodes. In particular, most transient loops in an insane system can be broken upon installation of forwarding state associated with the reverse unicast path. By performing this operation before beginning the more time-consuming process of recomputing the forward multicast path, the period of time during which transient loops can form is minimized. The step of breaking the forwarding state associated with the (old) forward multicast path interrupts the forwarding of multicast traffic from that node, and thus limits the amount of traffic that could potentially circulate in any loops that might form during the network resynchronization process.

In the embodiments described above with reference to FIG. 3, a node first computes (at S6) the shortest (unicast) path from itself to all other nodes in the network, and then examines the computed unicast paths to identify any nodes for which the unicast path to that node has changed (at S8). For each such node, multicast forwarding state for which that node is the root of the respective multicast tree is removed from the FDB (at S10). In an alternative embodiment, a different criterion may be applied to the removal of multicast state, with the benefit of minimising the duration of disruption to traffic. In particular, the computed unicast paths to identify any nodes for which the unicast path to that node has changed (at S8) as described above. In this case, however, each identified changed unicast path is then checked to determine if that path would have been "valid" in the previous network topology. The new path cannot, by definition, be the shortest path in the previous topology (otherwise there would be no change between the old and new paths), but it may have been a valid alternate path. "Valid", in this case, means that the new path to the root has a monotonic decrease in distance to the root when the nodes of the new path are traversed on the previous topology. This criterion is applied after a unicast path change to a root has been found, and tests whether the new unicast path to the root was a valid path to that root on the previous topology. If the new path would have been valid in the previous topology, new multicast state for that root may be computed and installed without awaiting the "go" conditions described above. If the new path would not have been valid in the previous topology, then the installation of new multicast state for that root must await receipt of "safe" indication signals from peer nodes, as described above.

The embodiment(s) of the invention described above is(are) intended to be exemplary only. The scope of the invention is therefore intended to be limited solely by the scope of the appended claims.

We claim:

1. A method of operating a link state protocol controlled network comprising a plurality of nodes having respective topology databases for storing a representation of a topology of the network, the method comprising:

detecting a network topology change;
   computing, in at least one node, respective information characterizing shortest unicast paths from the at least one node to at least one other node;
   detecting, in at least one node, whether an "unsafe" condition exists;
   at nodes where an "unsafe" condition is detected, removing forwarding state for multicast paths originating at other network nodes and subsequently advertising a "safe" indication to each neighbour node of the advertising node, the "safe" indication comprising a digest of the topology database of the advertising node;
   installing, in respective filtering databases (FDBs) at nodes achieving a "go" condition, forwarding state associated with multicast paths, the "go" condition comprising receiving at least one respective "safe" indication from at least one neighbour node; and
   forwarding packets in at least one node achieving a "go" condition based on the installed forwarding state.

2. The method of claim 1, wherein computing, in at least one node, respective information characterizing shortest unicast paths comprises computing, in at least one node, a respective distance from the at least one node to a respective other node for the shortest unicast path.

3. The method of claim 1, wherein computing, in at least one node, respective information characterizing shortest unicast paths from the at least one node to at least one other node comprises computing the respective information characterizing the unicast paths using the topology database.

4. The method of claim 3, wherein detecting, in at least one node, whether an "unsafe" condition exists comprises detecting at least one difference in a characteristic of a unicast path to another node relative to that characteristic of a previous unicast path to that other node.

5. The method of claim 4, wherein the characteristic of the unicast path is a distance to the other node.

6. The method of claim 4, wherein the characteristic of the unicast path is a route traversed by each of the computed and previous unicast paths to the other node.

7. The method of claim 3, wherein detecting whether an "unsafe" condition exists comprises detecting whether at least one computed unicast path would not have been a valid path in the previous topology.

8. The method of claim 1, wherein the digest of the topology database advertised by each node comprises information reflecting the detected network topology change.

9. The method of claim 1, wherein achieving the "go" condition at a node comprises receiving a respective "safe" indication from each neighbour node of the node.

10. The method of claim 1, wherein achieving the "go" condition at a node comprises receiving a "safe" indication signal from each neighbour node of the node on the multicast path.

11. The method of claim 7, wherein detecting whether an "unsafe" condition exists comprises, when the computed unicast path would have been a valid path in the previous topology, further determining whether a first neighbour node that is one hop from the node towards the other node along the computed unicast path in the current topology database is further from the other node than a second neighbour node was in the previous topology database.

12. The method of claim 5, wherein the "go" condition comprises:

when the distance to the other node is less than a previous distance to the other node, receiving a "safe" indication signal from a neighbour node of the node that is one hop from the node towards the other node along the computed multicast path; and
   when the distance to the other node is greater than a previous distance to the other node, receiving a respective "safe" indication signal from each neighbour node of the node that is one hop from the node away from the other node along the computed multicast path.

13. The method of claim 1, wherein detecting whether an "unsafe" condition exists comprises receiving at a node a respective "safe" indication from at least one neighbour node containing a respective topology database digest that does not match the topology database digest of the "safe" indication advertised by the node.

* * * * *